Patented Nov. 7, 1950

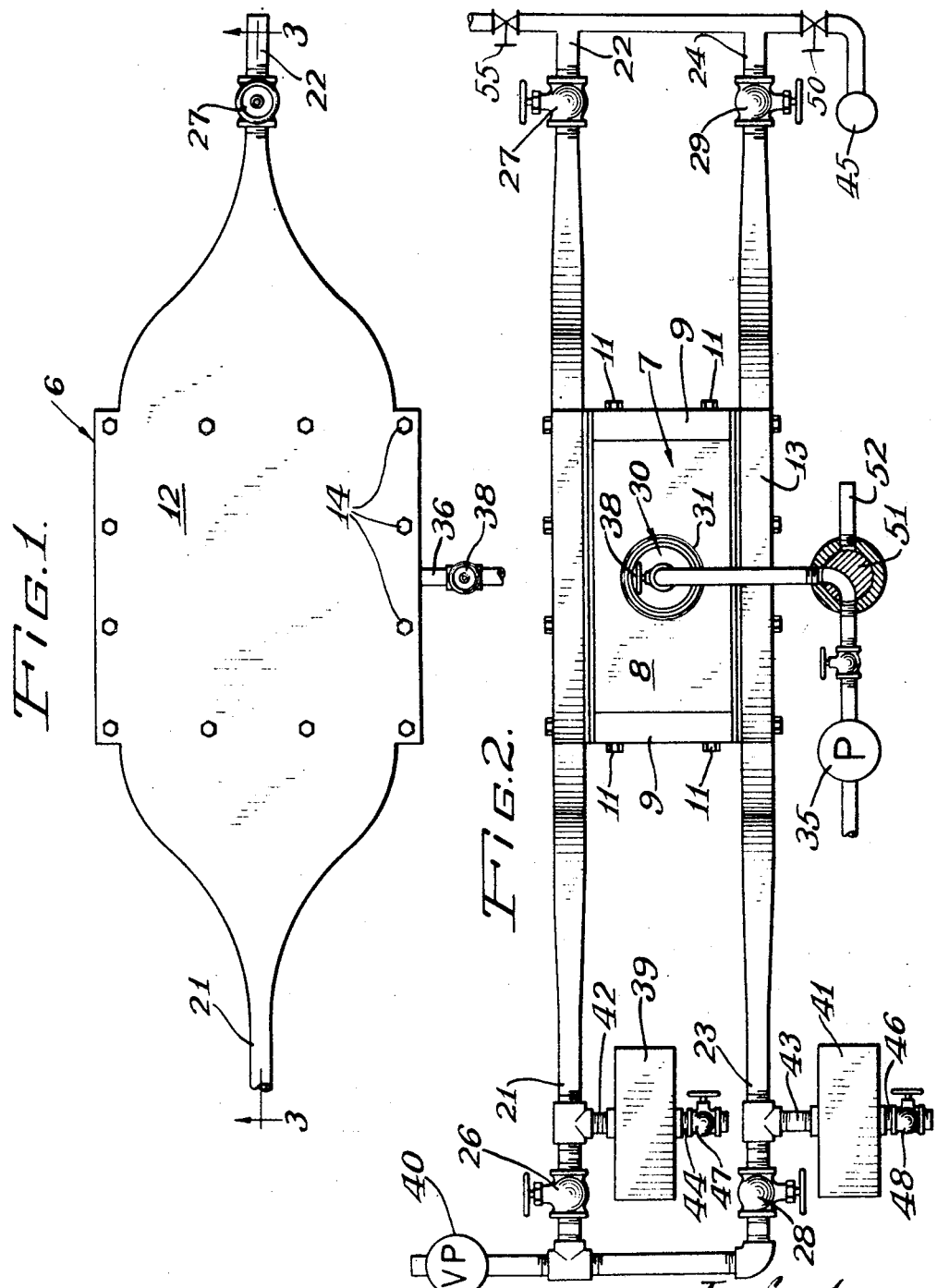

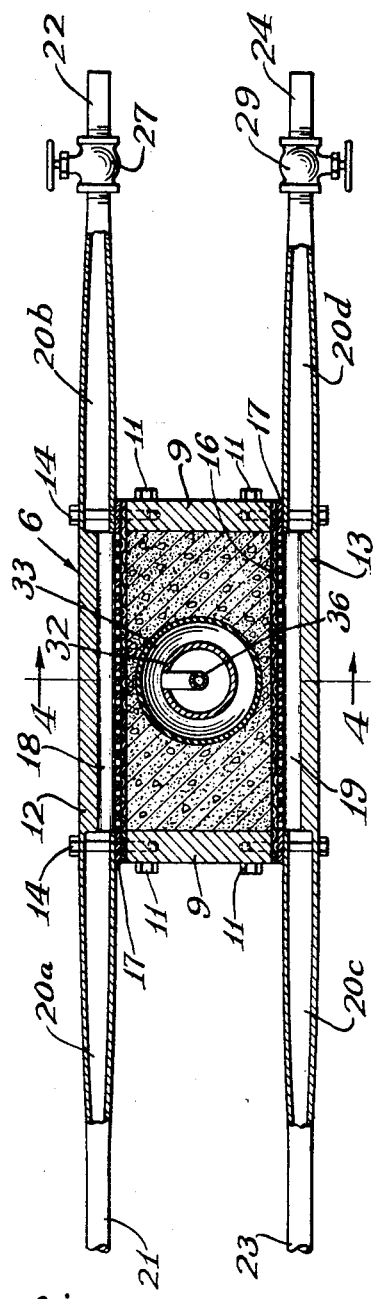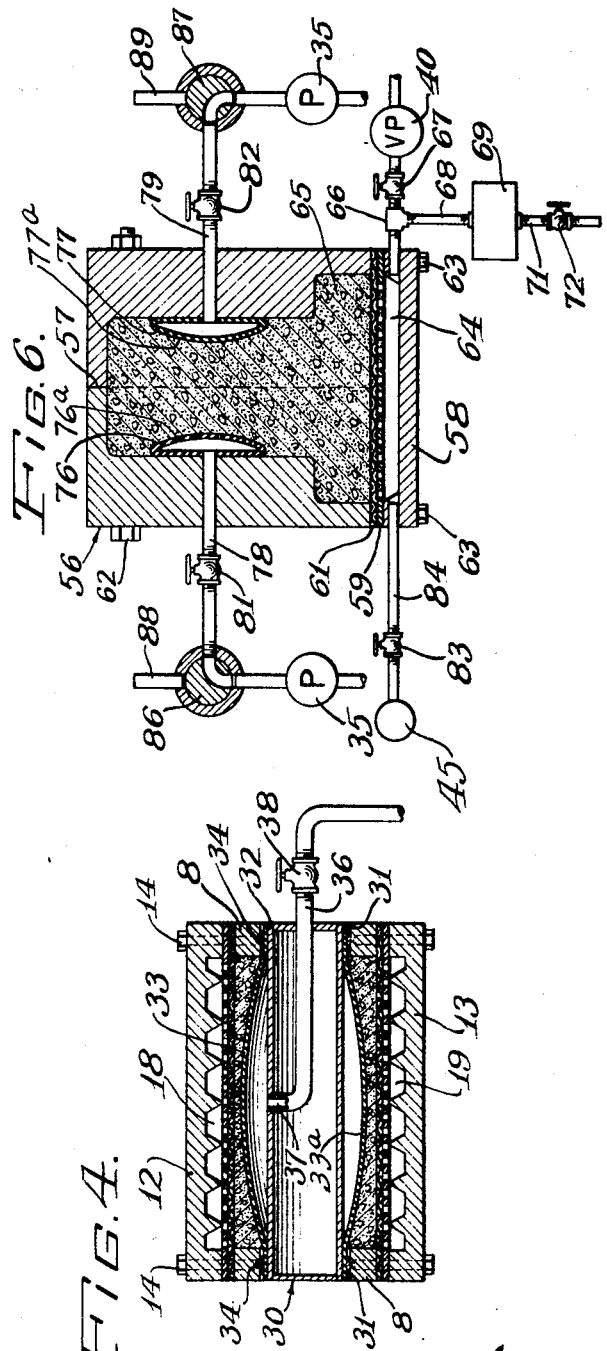

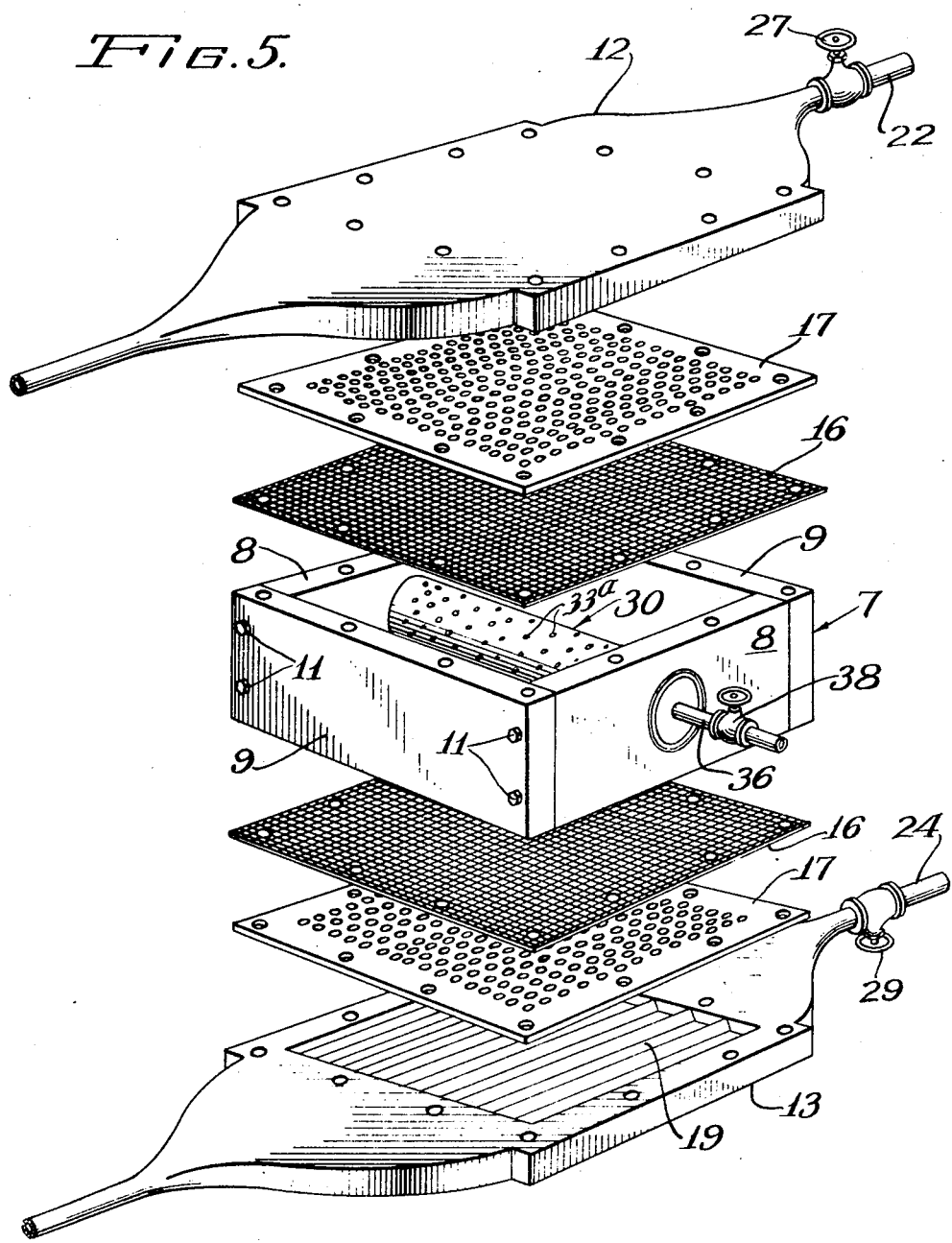

2,528,643

UNITED STATES PATENT OFFICE 2,528,643

PROCESS AND APPARATUS FOR MOLDING POROUS CONCRETE PRODUCTS

Carbon Chatley Dubbs, Orange, Calif.

Application November 23, 1949, Serial No. 128,975

9 Claims. (Cl. 25—118)

1

This invention relates to a method and apparatus for molding concrete products, and is more particularly concerned with the provision of a method and apparatus suitable for use in the manufacture of concrete products, such as building blocks, slabs, beams, posts, etc. The present application is a continuation-in-part of my copending applications Serial No. 121,802, filed October 17, 1949, and Serial No. 123,656, filed October 26, 1949.

Manufacturers have heretofore employed two methods in forming concrete products; one method employing the use of a relatively dry concrete mix, and the other method embodying the use of a relatively wet concrete mix. The dry pack method consists in consolidating a very dry concrete mix within a mold by ramming and/or vibration and then ejecting the product from the mold to permit immediate reuse of the mold. The dry pack method has certain inherent disadvantages in that the product has approximately 25% voids which tend to materially decrease the physical properties of the product, the mold must be left open at one end and the excess concrete removed from said open end prior to ejection of the product from the mold, the concrete product has a tendency to slump after its removal from the mold if the mix is not very accurately controlled, the molded product is limited to one finished surface, and the size and shape of the product is definitely limited due to the method of molding.

In molding a very fluid concrete mix, it has heretofore been the practice to pour the mix into a mold and then permit the concrete to harden within the mold. This method has heretofore been used for forming concrete, joists, some types of concrete pipe, statuary, etc. This method of molding a wet concrete mix has certain inherent disadvantages in that the mix has a high water-cement ratio which reduces the compressive strength of the material, causes undesirable shrinkage, checking, cracking, and crazing. Concrete with a high water-cement ratio also has a tendency to dust and is high in water absorption since the excess water which is not necessary for chemical reaction of the cement resides temporarily within the concrete causing bubbles and canals therethrough. A further disadvantage inherent in the relatively wet concrete mix method is that the molded product cannot be removed from the mold until the concrete has had sufficient time to set, which period may run from several hours to a full day. Even in applying a vacuum alone to the outer surface of the concrete, it would take a long period of time to withdraw sufficient excess water out so that the concrete could be removed from the mold and it would still retain an excess of water as the mineral aggregate would not be compacted as it is when water is squeezed out by internal pressure.

The present method and apparatus contemplates the use of a relatively wet concrete mix in which it is not essential to closely control the water-cement ratio, the mix being sufficiently fluid to facilitate handling and transportation and when poured into a mold will assume the shape of the interior of the mold. After the relatively wet mix is poured into a mold, internal pressure is applied inside of the mix to force the mix to all parts of the inner surface of the mold and to compact the mixture and at the same time to force out excess water through suitable filters arranged within the walls of the mold. The internal pressure is applied to the mix by means of expandable cores or bladders inflated with air or other compressible fluid, the cores or bladders being formed with perforations of predetermined number and size for the passage of air into and through the mix toward the filter walls of the mold. As the air passes through the concrete mix it carries some of the excess water from the mix through the filter walls and at the same time acts to form passageways throughout the mix. The method hereinafter described consists in removing the excess water from the mix within the mold prior to initial set of the concrete in order to improve the physical properties of the concrete product, and to also cause the mix to reach a "no-slump" consistency for immediate removal from the mold.

This invention further contemplates the provision of a method and apparatus in which internal pressure is applied to the mix within a mold to express excess water from the mix through filters provided within the walls of the mold, the mold being formed with vacuum chambers outside the filter screens to receive the excess water from the mix and to prevent the excess water from re-entering the mix when the internal pressure within the mix is relieved. The excess water is removed from the vacuum chamber prior to reduction of the internal pressure within the mix.

This invention further contemplates the provision of a method and apparatus in which a pressure or vacuum induced blast of hot or cold air or steam is employed for removing the excess water expressed from the mix from the surface of the filter screen and the surface of the concrete product adjacent thereto, the method employed for removing this excess water being determined by the characteristics of the concrete mix and by the end results desired. The purpose of the blast of air or steam is to prevent the expelled water from re-entering the concrete when the internal pressure therein is relieved.

Products manufactured by the method hereinafter set forth are accurate to the dimensions of the mold, have a controllable and predetermined surface finish, are relatively free of surface dusting, shrinkage, cracks and surface crazing, and are uniformly honey-combed with air passageways to decrease the density without material loss of strength. It will be appreciated that building blocks, slabs, etc., formed with air passageways embody relatively high insulating and acoustical properties. Products manufactured by the method and apparatus hereinafter set forth are so highly compacted prior to initial set that they can be immediately removed from the mold without appreciable change of shape or size.

This invention further contemplates the provision of a process wherein the concrete mix is in a highly fluid state in order that it may be placed in the mold without vibration and still fill restricted voids within the mold, the mix being sufficiently fluid to permit pumping, pouring or otherwise handling as a fluid.

This invention further contemplates the provision of a process wherein any reasonable variation in the volume of the concrete mix placed in a mold will be compensated for without damage to the physical properties or appearance of the finished product.

This invention further contemplates the provision of a process wherein the density, compactness and water-cement ratio of the concrete mix may be varied at will without materially affecting the quality of the product.

This invention embodies other novel features, details of construction and arrangement of parts which are hereinafter set forth in the specification and claims, and illustrated in the accompanying drawings, wherein:

Fig. 1 is a top plan view illustrating a molding apparatus embodying features of the present invention.

Fig. 2 is a side elevational view of same.

Fig. 3 is a longitudinal sectional view taken along the line 3—3 of Fig. 1.

Fig. 4 is a transverse sectional view taken along the line 4—4 of Fig. 3.

Fig. 5 is a perspective explosion view illustrating the construction and arrangement of parts embodied in the molding apparatus.

Fig. 6 is a transverse sectional view illustrating a modified form of molding apparatus.

Referring now to the drawings for a better understanding of this invention, the molding apparatus is shown as comprising a mold 6 having a body 7 formed of two side plates 8—8 and two end plates 9—9, the end plates being secured to the side plates by means of cap screws 11. Top and bottom covers 12 and 13, respectively, are secured to opposite faces of the body 7 by means of cap screws 14. Interposed between each cover and the body 7 is provided a relatively fine mesh filter screen 16 and an apertured plate 17, the filter screens 16—16 being disposed adjacent the mold body 7 and the apertured plates 17—17 being disposed adjacent their respective covers.

The covers 12 and 13 are recessed on their inner faces to form vacuum chambers 18 and 19, respectively. Passageways 20a and 20b lead outwardly through the ends of the cover 12 from the vacuum chamber 18 to conduits 21 and 22. Passageways 20c and 20d are formed in the cover 13 to lead outwardly from the vacuum chamber 19 to communicate with conduits 23 and 24. Valves 26 and 27 are interposed in the conduits 21 and 22, respectively. Valves 28 and 29 are interposed in the conduits 23 and 24, respectively.

Core openings 31—31 are formed in the side walls 8—8 of the mold body 7 to snugly receive the ends of a core 30. The core 30 comprises a cylindrical metal mandrel 32 and a sleeve 33 of resilient material, such as rubber, is mounted over the mandrel 32 and securely engaged thereto at its ends by means of locking bands 34. The sleeve 33 is formed with a plurality of apertures 33a for the passage of air from the interior of the sleeve through the concrete mix and thence through the filter screen 16 and apertured plate 17. The apertures 33a are of predetermined size and number to permit expansion of the sleeve in compressing the concrete mix against the inner surfaces of the mold. The locking bands 34 are adapted to provide an air-tight engagement between the sleeve 33 and the mandrel 32. A conduit 36 leads inwardly through one end of the mandrel 32 and thence laterally at 37 to the surface of the mandrel to direct air or fluid into the space between the sleeve and the mandrel to inflate and expand the sleeve 33. During expansion of the sleeve 33, it acts to engage the surfaces defining the openings 31—31 and thus serves as a seal to prevent the concrete from leaking out of the mold. The conduit 36 leads to a pump 35 or other suitable source of air or fluid under pressure and is provided with a suitable control valve 38. It is contemplated that any number of mandrels 32 and sleeves 33 may be employed, and that they may be of any practical shape.

Conduits 21 and 23 are adapted to be connected to a suitable vacuum pump 40; while the conduits 22 and 24 lead to the atmosphere and also to an air compressor or steam generator 45. Water accumulators 39 and 41 are connected to their respective conduits 21 and 23 by means of conduits 42 and 43, respectively. The water accumulators 39 and 41 are provided with drain conduits 44 and 46, respectively, controlled by valves 47 and 48, respectively.

In the manufacture of concrete products in a molding apparatus of the type thus shown and described, a relatively wet concrete mix is placed within the body of the mold and the cover 12 is then secured in position to close the mold. The valve 38 in the conduit 36 is opened to permit compressed air or fluid under pressure to enter the space between the mandrel 32 and sleeve 33 to cause the sleeve to expand. During expansion of the sleeve 33, it first acts to seal itself against the walls of the openings 31. The mold is then filled with the concrete mix and the sleeve is then further expanded to exert internal pressure against the concrete mix within the mold. As the sleeve expands it expresses excess water from the concrete mix, the excess water passing toward and through the filter screens 16—16 and apertured plates 17—17 into the vacuum chambers 18 and 19. During expansion of the sleeve 33 in compressing the concrete mix against the inner surfaces of the mold, some of the air within the sleeve passes outwardly through the apertures 33a and thence through the concrete mix toward and through the filter screens 16—16, The air thus passing through the concrete mix entrains and carries some of the excess water from the mix through the filter screens and into the vacuum chambers 18 and 19. It will also be noted that the air acts to form honey-comb passageways throughout the concrete mix, thus producing a concrete product having improved insulating and acoustical properties. The major portion of the water within the vacuum chambers 18 and 19 is caused to flow outwardly by gravity through the conduits 21 and 23 and thence through the conduits 42 and 43 into the water accumulators 39 and 41.

My copending patent application Serial No. 121,802 discloses a method and apparatus in which the major portion of the excess water within the vacuum chambers 18 and 19 flows by gravity into the accumulators 39 and 41; after which, the remaining excess water is removed from the vacuum chambers, the filter screens and the surface of the concrete adjacent thereto by operating the vacuum pump 40. The present invention contemplates the removal of the excess water from the vacuum chambers 18 and 19, filter screens and the surface of the concrete adjacent thereto by means of blasts of hot or cold air or steam from an air compressor or steam generator, respectively, indicated schematically at 45. While most of the excess water may be removed from the vacuum chambers 18 and 19 by gravity, it will be appreciated that some of the excess water will adhere to the filter screen and to the surface of the concrete adjacent thereto. By directing blasts of hot or cold air or steam through the vacuum chambers while the expansible sleeve 33 is in its inflated condition to apply pressure internally of the mix, the excess water is removed from the filter screen and the concrete surface adjacent thereto by either entrainment or evaporation. It is thus possible in the operation of the method and apparatus herein disclosed to deflate the expansible sleeve 33 without having any of the excess water re-entering the mix.

It will, of course, be apparent that the vacuum condition within the vacuum chambers 18 and 19, the internal pressure exerted by the sleeve 33 against the concrete mix, and the amount of air passing from the sleeve through the mix may be varied depending upon the amount of excess water which is to be removed from the mix and the length of time employed during the molding operation. By setting up an internal pressure within the mold by means of the expansible sleeve, it will be noted that the concrete mix is forced into all the corners and other restricted portions of the mold to insure a smooth exterior appearance for the finished product. It will also be apparent that the passage of air from the sleeve 33 through the concrete mix acts to produce honey-comb passageways which result in a product having improved insulating and acoustical properties.

After the excess water has been removed from the concrete mix, the valves 26, 28 and 50 are closed, and the valves 27, 29 and 55 are opened. A three-way valve 51 leading to the atmosphere through a conduit 52 is then opened to deflate the sleeve 33 to permit the core 30 to be withdrawn from the mold. The cover 13 and its respective filter screen 16 and apertured plate 17 are then removed from the mold and replaced by a suitable pallet (not shown). The rest of the mold is then disassembled and the concrete product is removed on the pallet.

Referring now more particularly to Fig. 6 in the drawings, a modified form of molding apparatus is shown as comprising a split mold 56 divided along the line 57. The mold 56 is provided with a cover 58, an apertured plate 59 and a filter screen 61 to close one face of the mold. The two sections of the mold 56 are secured together by any suitable means, such as bolts 62, and the cover 58 is secured to the mold by means of cap screws 63. The cover 58 is formed with a vacuum chamber 64 to receive excess water from the concrete mix 65. A vacuum condition is created within the vacuum chamber 64 by means of a suitable vacuum pump 40 which communicates with the vacuum chamber through a conduit 66 controlled by a valve 67. The major portion of the excess water is adapted to flow by gravity from the vacuum chamber 64 through conduit 66 and thence through the conduit 68 into a water accumulator 69. A conduit 71, normally closed by a valve 72, leads from the water accumulator 69 to the atmosphere. A conduit 84 having a valve 83 interposed therein leads from the vacuum chamber 64 to an air compressor or steam generator generally indicated at 45.

A pair of inflatable rubber tubes 76 and 77, formed with apertures 76a and 77a, respectively, are disposed in opposing relation against opposite side walls of the mold 56. The tubes 76 and 77 are inflated by means of compressed air or fluid passing through conduits 78 and 79, respectively, under the control of valves 81 and 82, respectively.

During expansion of the tubes 76 and 77 an internal pressure condition is created within the relatively wet concrete mix 65 to express the excess water through the filter screen 61 and apertured plate 59 into the vacuum chamber 64 and thence through the conduits 66 and 68 into the water accumulator 69. While the tubes 76 and 77 are in their expanded condition, some of the air within the tubes passes outwardly through the apertures 76a and 77a and thence through the concrete mix and filter screen 61 into the vacuum chamber 64. As the air passes through the concrete mix, it entrains some of the excess water within the mix and also forms honeycomb passageways throughout the mix. While the tubes 76 and 77 are in their expanded condition, blasts of hot or cold air or steam, induced by pressure, vacuum, or both, are directed through the conduit 84 and thence through the vacuum chamber 64 to remove the excess water from the chamber, filter screen 61 and the concrete adjacent thereto by entrainment and/or evaporation. After a predetermined amount of the excess water has been expressed from the concrete mix and then removed from the mold in the manner described, a pair of three-way valves 86 and 87 are operated to permit the air or fluid within the tubes 76 and 77 to pass outwardly to the atmosphere through conduits 88 and 89. The valve 67 in the conduit 66 leading to the vacuum pump is closed, and the valve 83 in the conduit 84 leading to the air compressor or steam generator 45 is closed. The concrete product is then removed from the mold 56 by removing the cap screws 63 and bolts 62 and then moving the two sections of the mold laterally away from each other.

The type of mold illustrated in Figs. 1 to 5 in the drawings is particularly adapted for use in forming concrete blocks or other products requiring a relatively smooth exterior surface of predetermined dimensions. The molding apparatus illustrated in Fig. 6 in the drawings is particularly suitable for use in molding concrete posts, joists, slabs, and the like in which it is not essential to provide uniform exterior surfaces to exact dimensions.

In the operation of the two forms of apparatus herein shown and described, it will be noted that sufficient excess water is provided in the concrete mix to render the same sufficiently fluid to be poured into and to fill all parts of the mold. After the mold is closed, the expansible member is expanded by compressed air or fluid to force the concrete mix against all the inner surfaces of the mold and at the same time to compact the mix and to force the excess water within the mix through suitable filters embodied in the mold. During inflation of the expansible members, the air passing from said members through the concrete mix acts to entrain and carry the excess water from the mix into the vacuum chamber and thence into a water accumulator, while any remaining excess water on the filter screen and the surface of the concrete mix adjacent thereto is carried away by either a pressure or vacuum induced blast of hot or cold air or steam or by a combination of pressure induced blasts followed by a vacuum induced blast employing either air or steam. The selection of any of the above methods for removing the excess water from the mix and from the filter screen and surface of the concrete mix must necessarily be governed by the characteristics of the concrete fluid mix and by the end results desired. The purpose of the blast of air or steam is to prevent the expelled excess water from re-entering the concrete mix when the internal pressure exerted by the expansible member is relieved. All of the steps in the molding process herein set forth are carried out prior to any initial set of the concrete mix, the compacted concrete mix being removed from the mold and disposed in any suitable place, upon a pallet, to acquire an initial set. The pressure exerted by the expansible member against the concrete mix, and the quantity of air flowing from the expansible member through the concrete mix, may be varied to bring about the desired results, but in any event a sufficient amount of excess water must be removed from the concrete mix and sufficient pressure must be exerted in compressing the concrete mix to permit immediate demolding of the mix without causing same to slump or change its shape.

Pressure induced blasts of hot or cold air may be directed through the vacuum chambers 18 and 19 of the apparatus illustrated in Figs. 1 to 5 by means of the air compressor indicated at 45, the valves 27, 29, 47 and 48 being opened and the valves 26 and 28 being closed. By alternately opening and then closing the valve 50, it will be apparent that blasts of hot or cold air may be directed through the chambers 18 and 19 to remove excess water from the filter screens 16—16 and the adjacent surface of the concrete mix by entrainment or evaporation.

In creating a vacuum induced blast of air through the vacuum chambers 18 and 19, the valves 26, 27, 28 and 29 are opened, the valves 47, 48 and 50 are closed. By operating the vacuum pump 40 and by alternately opening and closing the valve 55, it will be noted that vacuum induced blasts of air are caused to pass through the vacuum chambers 18 and 19 to remove excess water from the filter screens and the surface of the concrete mix adjacent thereto by entrainment and evaporation. In the event it is found desirable to employ the use of hot air blasts for removing excess water by entrainment and evaporation, it is apparent that a suitable source of heated air may be provided and directed into the conduits 22 and 24 for movement through the vacuum chambers 18 and 19 by means of the operation of the vacuum pump 40 or air compressor 45.

While this invention has been shown in but two forms, it is obvious to those skilled in the art that it is not so limited but is susceptible of various changes and modifications without departing from the spirit and scope of the claimed invention.

I claim as my invention:

1. The method of molding a relatively porous concrete product which comprises, placing a relatively fluid concrete mix within a closed mold, creating an internal pressure within the mix to compress and force the mix against the inner surfaces of the mold to express excess water from the mix and mold, directing streams of aeriform fluid into and through the mix to entrain and carry excess water from the mix and the mold, and then removing the compressed mix from the mold prior to initial set of the mix.

2. The method of molding a relatively porous concrete product which comprises, placing a relatively fluid concrete mix within a closed mold, creating an internal pressure within the mix to compress and force the mix against the inner surfaces of the mold to express excess water from the mix and mold, directing streams of aeriform fluid into and through the mix to entrain and carry excess water from the mix and the mold, then removing excess water from the outer surface of the concrete mix, and then removing the compressed mix from the mold prior to initial set of the mix.

3. The method of molding a relatively porous concrete product which comprises, placing a relatively fluid concrete mix within a closed mold, creating an internal pressure within the mix to compress and force the mix against the inner surfaces of the mold to express excess water from the mix and mold, directing streams of aeriform fluid into and through the mix to entrain and carry excess water from the mix and the mold, then removing excess water from the outer surface of the concrete mix, and then removing the compressed mix from the mold prior to initial set of the mix by a blast of aeriform fluid.

4. In an apparatus for molding a relatively porous concrete product, a closed mold to receive a relatively fluid concrete mix, a filter screen provided on said mold for the passage of excess water from the mix and the mold, an expansible member disposed within the mold to compress and force excess water from the mix and through the filter screen, means to inflate said expansible member with an aeriform fluid, said expansible member being formed with apertures to direct streams of aeriform fluid into and through said mix and said filter screen.

5. In an apparatus for molding a relatively porous concrete product, a closed mold to receive a relatively fluid concrete mix, a filter screen provided on said mold for the passage of excess water from the mix and the mold, an expansible member disposed within the mold to compress and force excess water from the mix and through the filter screen, means to inflate said expansible member with an aeriform fluid, said expansible member being formed with apertures to direct streams of aeriform fluid into and through said mix and said filter screen, and a vacuum chamber to receive excess water flowing from said mix through said filter screen.

6. In an apparatus for molding a relatively porous concrete product, a closed mold to receive a relatively fluid concrete mix, a filter screen provided on said mold for the passage of excess water from the mix and the mold, an expansible member disposed within the mold to compress and force excess water from the mix and through the filter screen, means to inflate said expansible member with an aeriform fluid, said expansible member being formed with apertures to direct streams of aeriform fluid into and through said mix and said filter screen, a vacuum chamber to receive excess water flowing from said mix through said filter screen, and means to produce a blast of aeriform fluid through said chamber to remove excess water from the filter screen and from the outer surface of the compressed concrete mix.

7. In an apparatus for molding a relatively porous concrete product, a closed mold to receive a relatively fluid concrete mix, a filter screen provided on said mold for the passage of excess water from the mix and the mold, an expansible member centrally disposed within the mold to compress and force excess water from the mix and through the filter screen, means to inflate said expansible member with an aeriform fluid, said expansible member being formed with apertures to direct streams of aeriform fluid into and through said mix and said filter screen.

8. In an apparatus for molding a relatively porous concrete product, a closed mold to receive a relatively fluid concrete mix, a filter screen provided on said mold for the passage of excess water from the mix and the mold, an expansible member disposed within and along one side of the mold to compress and force excess water from the mix and through the filter screen, means to inflate said expansible member with an aeriform fluid, said expansible member being formed with apertures to direct streams of aeriform fluid into and through said mix and said filter screen.

9. In an apparatus for molding a relatively porous concrete product, a closed mold to receive a relatively fluid concrete mix, a filter screen provided on said mold for the passage of excess water from the mix and the mold, an expansible member disposed within the mold to compress and force excess water from the mix and through the filter screen, means to inflate said expansible member with an aeriform fluid, said expansible member being formed with apertures to direct streams of aeriform fluid into and through said mix and said filter screen, a vacuum chamber to receive excess water flowing from said mix through said filter screen, and means to create a vacuum condition within said vacuum chamber.

CARBON CHATLEY DUBBS.

No references cited.